United States Patent [19]
Klemm et al.

[11] Patent Number: 5,379,805
[45] Date of Patent: Jan. 10, 1995

[54] SINGLE SOLID THIN WALL PIPE FOR ABRASIVE MATERIAL HAVING A GRADUAL TRANSITION IN HARDNESS

[75] Inventors: Robert E. Klemm, Cedarburg; Gary D. Lehnhardt, Cedargrove, both of Wis.

[73] Assignee: Construction Forms, Cedarburg, Wis.

[21] Appl. No.: 991,118

[22] Filed: Dec. 16, 1992

[51] Int. Cl.⁶ ............................................. F16L 9/04
[52] U.S. Cl. ................................. 138/109; 138/172; 138/177
[58] Field of Search ............... 138/177, 178, 109, 172, 138/174; 148/39, 15.5, 165

[56] References Cited

U.S. PATENT DOCUMENTS

| | | | |
|---|---|---|---|
| 2,340,349 | 2/1944 | Somes | 138/177 |
| 2,503,512 | 4/1950 | Sattele et al. | 138/177 |
| 2,541,116 | 2/1951 | Somes | 138/177 |
| 3,661,537 | 5/1972 | Aronson et al. | 138/177 |
| 4,151,012 | 4/1979 | SimKovich et al. | 138/177 |
| 4,261,769 | 4/1981 | Usui | 138/177 |
| 4,570,708 | 2/1986 | Tiberg | 138/177 |
| 4,804,021 | 2/1989 | Hasegawa et al. | 138/177 |
| 5,097,585 | 3/1992 | Klemm . | |
| 5,213,633 | 5/1993 | Hada et al. | 138/177 |

*Primary Examiner*—James E. Bryant, III
*Attorney, Agent, or Firm*—Andrus, Sceales, Starke & Sawall

[57] ABSTRACT

A thin wall mild carbon steel pipe for pumping concrete has a wall which has an internal diameter of five inches and a wall thickness in the range of 0.170 to 0.200. The composition of the pipe wall by weight is in percentages ranges of 0.27 to 0.34 carbon, 0.30 to 0.60 manganese, less than 0.30 silicon with only traces of phosphorus and sulfur. The pipe has an inner hardened wall portion of RC reading of about 60 and of a thickness in the range of 0.04 to 0.06 inches and a gradual transition in hardness therefrom to an outer ductile wall reading of about 30 RC. The unhardened mild carbon steel pipe is processed by progressively and successively heating axially annular portions of the pipe to a hardening temperature of 1650° F. A quenching brine solution at a temperature below 50° F. is immediately sprayed at a high velocity onto the progressively heated surface to reduce the temperature of the inner wall essentially instantaneously to the temperature of the brine solution. This hardens the inner wall to a depth of about 0.04 to 0.06. The brine solution in a five inch pipe is pumped at 150 gallons per minute and 100 feet per second.

7 Claims, 1 Drawing Sheet

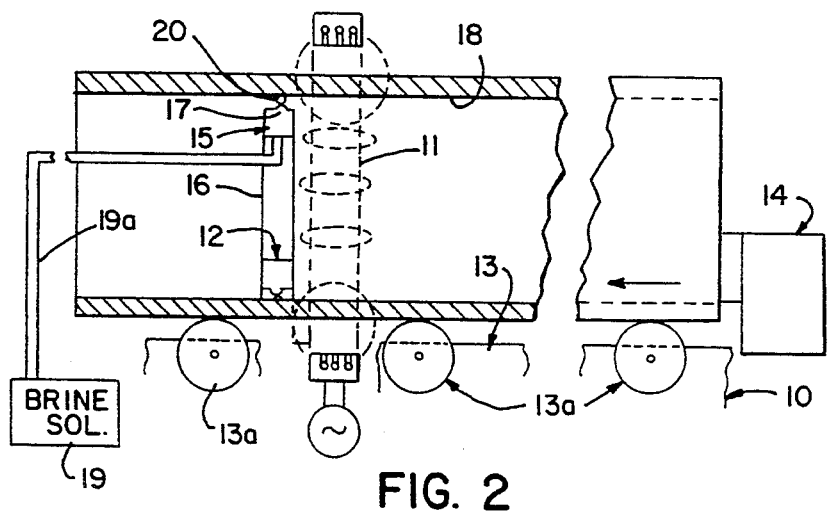
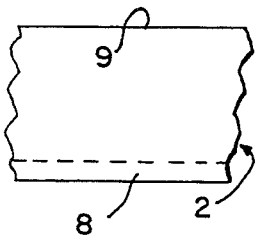
FIG. 2
FIG. 1a
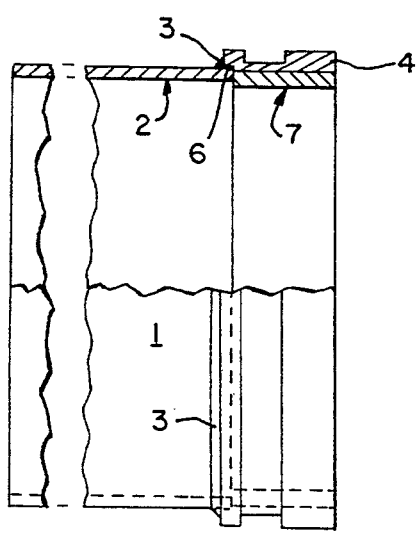
FIG. 1
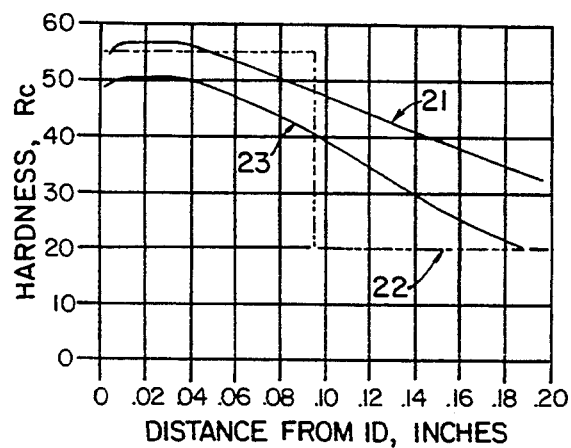
FIG. 3

SINGLE SOLID THIN WALL PIPE FOR ABRASIVE MATERIAL HAVING A GRADUAL TRANSITION IN HARDNESS

BACKGROUND OF THE PRESENT INVENTION

This invention relates to pipe and to the method of fabricating such pipe for carrying of abrasive materials under relatively high pressures.

In high pressure flow systems carrying abrasive materials, the inner surface or wall is normally required to have a relatively hard characteristic. However, to provide a high strength pipe, the outer wall should have a ductile characteristic. Such pipe is required in various hydraulic and pneumatic lines for the conveyance of abrasive or semi-solids materials and the like. A dual wall pipe for such applications is particularly disclosed in the U.S. Pat. No. 5,097,585 which issued Mar. 24, 1992 to Robert E. Klemm and is assigned to the assignee of this application. A dual wall pipe particularly adapted for pumping of concrete and other such highly abrasive materials under relatively high pressures and particularly pressure surges is fully disclosed in such patent along with a unique method of forming such pipe. Various other prior art patents are also discussed therein.

As more fully disclosed in the above patent, the dual wall pipe is preferably formed using a special procedure involving induction heating telescoped pipe members which are located in closed spaced relation and mechanically worked to establish a relatively firm engagement prior to induction heating. The inner pipe is heated to a hardening temperature and rapidly quenched to harden the inner pipe while maintaining a significant degree of ductility in the outer pipe while simultaneously closing the gap between the pipes to produce intimate contact between the two pipes. The result is a pipe unit having a highly hardened inner wall and a ductile outer wall thereby producing a pipe carrying abrasive materials under high pressure as in concrete pumping.

Although such dual wall pipe is widely used and has reached significant acceptance in the trade of concrete pumping and the like, there has been and is presently a demand for a single wall pipe which can replace dual wall pipe with a corresponding cost reduction. With prior art technology, single wall pipes of a very special chemistry and of a wall thickness of at least ⅜ of an inch and generally in a range of ⅜ to ½ inch have been available for some period of time. In this technology, the heavy single wall tubing is formed of a special material having a special chemistry of the pipe as the controlling factor. Thus, such pipe requires a very high carbon content with the hardenability controlled by the use of alloys in order to achieve a distinct hardness profile including a hard inner surface with the hardening factor decreasing through the radial wall thickness to the outer surface. The necessity of this profile is well recognized. Thus, if a product had the necessary hardness throughout the entire cross section, the article would be extremely brittle and would be unacceptable for various applications such as concrete pumping systems and the like which includes a high pressure pumping system and particularly high pressure surges. Thus, concrete pumping systems and the like constantly flex and move both as a result of the pressure surges and spikes as well as mechanical and physical contact on the job site.

Although the heavy single wall has found some acceptance, the pipe is reasonably expensive because of the special chemistry involved. It is used primarily where weight restrictions have not been placed on the pipe specifications.

Single wall pipe which has not been hardened is often used for mobile truck mounted concrete pumping system, such as described and shown in the Klemm patent. In such applications, weight of the pipe is of substantial significance and manufacturers of mobile units have made strict weight limitations for the steel pipe for use on their mobile units. Generally, current specification require a thickness no greater than 0.197 inches, and in some specification, no greater than 0.170 inches.

With the special carbon and metallurgical requirements, the commercially available ⅜ inch hardened pipe, for example, claims to have a life of 3 to 8 times that of conventional mild steel. Although a pipe of a lesser thickness is available, the hardness characteristic is only slightly different than that of mild steel and consequently the life is not significantly greater. Another significant difficulty encountered in thin wall pipe is the ability to reproduce the characteristic and thereby provide a reliable pipe unit with necessary cost effective production.

As a result of the current status of the art, there is a continuing demand for a thin wall pipe having the characteristic of dual wall pipes.

SUMMARY OF THE PRESENT INVENTION

The present invention is particularly directed to the forming of a thin wall pipe having an extremely hard inner surface or wall while maintaining a significant lesser hardness and significantly greater ductility at the outer surface and wall. The thin single wall pipe disclosed by the present invention can function as a replacement for the dual wall pipe such as disclosed in and made in accordance with the previously identified patent for many applications at a significant reduction in cost. Generally, in accordance with the present invention, a thin wall pipe is defined as a pipe having a thickness generally in a range which is less than 0.200 inches and formed of a mild carbon steel. The thin wall pipe is processed to form a hard inner wall portion and a substantially more ductile outer surface or wall portion, with a changing profile between the outer wall portion and the inner wall portion. Generally, in accordance with the teaching of this present invention, a mild carbon steel pipe having a carbon content in the range of substantially 0.27 to 0.34 by weight, is heated to rapidly raise the temperature of the pipe. The heating unit and pipe move relative to each other and the pipe is heated progressively. Immediately upon heating to the necessary hardening temperature, an uncommonly low temperature quenching fluid is projected particularly at high velocity onto the annular surface. This intimate contact and particularly cold quenching fluid effects a practically instantaneous hardening of the inner wall of the pipe. The apparatus used may advantageously be similar to that disclosed in the above Klemm patent which includes an annular induction heating field unit to progressively heat the pipe structure in combination with an annular flow of highly refrigerated quenching fluid projected outwardly from a nozzle unit located in close spaced relation to the inner wall of the pipe. The quenching flow is thus located immediately adjacent the discharge side of the induction field and applied to the pipe as it moves from the field. Generally, the inner surface of the pipe is heated to a temperature of at least approximately 1,650° F. and then as a result of the close spaced annular flow, instantly quenched by a using a refrigerated quenching fluid having a temperature less than approximately 50° F. and preferably, on the order of 42° F. Finally, the pipe for optimum results is stressed relieved in a holding furnace to further enhance the ductility while maintaining the desired extremely hard inner surface.

The composition of the pipe is a medium mild steel and generally having a carbon in the range of 0.27 to 0.34 with significant amounts of manganese and lesser amounts of silicon. Traces of phosphorus and sulfur are normally present in commercially available pipe and has been found acceptable. Tubing consisting of the above chemical composition is readily available as a standard grade mild carbon steel and the present invention completely avoids the necessity of ordering a steel pipe with special specifications.

The quenching water or other fluid at less than approximately 50° F. is significantly colder than that which has been used in the process of hardening pipe and the like. Applicant, however, discovered that such overcooling of the quenching fluid resulted not only in rapid and effective hardening, but also established a definitive relationship between the inner surface hardening and the quench temperature. This relationship resulted in effective penetration into the inner wall with a changing profile to a ductile outer wall. Of great significance was the fact that the inventor discovered a highly repeatable profile was obtained in mass production of thin hardened pipe. As a result, the thin pipe constructed in accordance with the teaching of this invention provides an essentially ideal characteristic in the thin wall pipe and a pipe having a characteristic which functionally is similar to dual wall pipe. The pipe produced in accordance with the present invention thus provides a product for which there has been a significant demand and which to the knowledge of the present inventor has not been provided prior to the development of this invention. In particular, with the present invention, mass production of thin wall pipe has been produced having a hardness of 60 on the Rockwell scale at the inner diameter and for a thickness extending approximately throughout the first 25% of the wall thickness and then changing in a gradual slope to a hardness of 25 on the Rockwell scale in the outer portion. Tensile stress tests indicate the strength of the material varies between 309,000 psi at the inner surface to 55,000 at the outer surface.

As compared to dual wall pipe, the thin wall tube of the present invention is readily manufactured at lesser material and fabricating costs. The single wall pipe further is desired because there is no liner, which can separate from the outer pipe. The internal stresses resulting from hydraulic pressure surges are distributed across the entire wall thickness. The entire wall thickness is also, of course, available and usable for wear and the wall thickness can be measured ultrasonically to ensure quality of the product. This wear characteristic in contrast to a dual wall pipe of similar thickness wherein essentially only the relatively thin inner liner is available for any significant wear characteristic.

The present invention thus provides a product which is long been in demand and at a highly competitive cost.

DESCRIPTION OF THE DRAWINGS

The drawings herewith generally illustrate the best mode presently contemplated for the carrying out the invention and are described hereinafter.

In the drawings:

FIG. 1 is a cross sectional view of a concrete pumping pipe constructed in accordance with the teaching of the present invention;

FIG. 1a is a fragmentary portion of a pipe constructed in accordance with this invention;

FIG. 2 is a simplified illustration of a production line for producing a thin wall pipe in accordance with one embodiment of the present invention; and FIG. 3 is a graphical illustration comparing the single wall embodiments of the present invention with the dual wall pipe structure of a corresponding thickness.

DESCRIPTION OF ILLUSTRATED EMBODIMENT

FIG. 1 illustrates a section of a concrete pumping pipe unit 1 suitable and particularly adapted for incorporation into a mobile concrete pumping assembly, not shown. As illustrated, the pipe unit 1 includes a main tubular pipe 2 having a relatively thin wall and generally in a range less than 0.20 inches. Typical presently commercially manufactured pipe 2 by the present assignee and others has a thickness of 0.197 inches although lesser thicknesses are also available.

The pipe 2 is secured, as by a weld 3, to a pipe connector 4 for interconnection with a pipe elbow 5, another line pipe such as pipe 2 and the like as required in flow systems and particularly mobile concrete pumping assemblies. Connector 4 is recessed as at 6 to telescope over the end of the pipe 2 and with the pipe 2 projecting radially inwardly therefrom. The weld 3 is applied between the outer surface of pipe 2 and the outwardly projecting wall of the connector 4. An end liner 7 is secured within the connector 4 and projects inwardly of pipe 2. The liner 7 is conveniently attached by a suitable press fit and a hardened high carbon steel. The inside diameter of the connector liner 7 is slightly smaller than the inside diameter of the thin wall pipe 2. This diameter relationship protects the heat effected weld zone and the end of pipe 2 and thereby establishes an improved performance and life of the pipe unit 1.

The main thin wall pipe 2 is constructed with a varying profile such as shown in FIG. 3, with a high hardness level in the inner wall portion 8 and a gradually reduced hardness to a relatively soft ductile outer wall portion 9. The pipe is formed from a mild carbon steel by heating of the unit in a manner to raise the inner surface to a hardening temperature of at least 1,650° and then rapidly quenching such inner surface with a super cooled quench liquid at high velocity to produce a thin and hard inner wall portion 8 and a gradually reduced hardness to the relatively ductile outer wall portion 9, such as shown in FIG. 3. A typical velocity which has given commercially satisfactory results in processing of a mild steel pipe having an internal diameter of five inches was obtained with a flow of 150 gallons per minute and velocity of 100 feet per second.

In the illustrated embodiment of the invention, the pipe 2 is treated generally in accordance with an apparatus as shown in the '585 patent. Generally, and with reference to FIG. 2, the pipe 2 is mounted in a supporting frame structure 10 for relative movement with respect to an encircling induction heating coil 11 and an immediately adjacent annular quenching unit 12. In the illustrated embodiment of the invention, the pipe is mounted on a supporting roller track 13 of any suitable construction, and is shown including a series of supporting rollers 13a for proper support of the pipe 2. In a practical structure for processing of 40 ft. length pipes, 8 or more rollers of a larger diameter than those shown would generally be provided to support the pipe 2 for movement through the heating/quenching assembly. A drive unit 14 is coupled to the heating unit and the supporting track unit to establish relative movement therebetween. The length of the heating coil unit is on the order of 14 to 18 inches and provides continuous alignment with progressively portions of the pipe 2. Energizing of the coil unit provides rapid heating of the aligned area of the pipe corresponding generally to the axial length of the pipe with the temperature at the trailing end of the coil unit being raised to a minimum hardening temperature and generally on the order of 1,650° F., the temperature generally required for hardening of mild steel. The relative movement of the coil unit and pipe provides for the continuous progressive heating of the pipe. As in the dual wall patent, the coil is energized with a suitably frequency which may be a relatively low frequency as in the Klemm patent or a high frequency. Generally, frequency of 180 Hertz and of 1000 Hertz has been used. Thus, in this application, the pipe 2 may be heated and is preferably heated throughout the thickness of the wall. The increase in the hardness of the inner wall area relative to the outer wall area with the gradual change results from the interaction of the uncommonly cooled quench liquid and the wall temperature.

The quenching unit 12 is thus mounted immediately upstream of the heating coil and similarly moved relative to pipe 2. The illustrated quenching unit 12 again includes an inner annular nozzle unit 15 including a generally cylindrical ring member 16. A plurality of nozzles 17 are circumferentially distributed about the nozzle ring 16 and terminate in close spaced relation to the inner surface 18 of the pipe 2. A quenching solution source 19 is mounted to the end of the machine support and connected by suitable flow lines 19 to the nozzle ring and thereby the nozzles. The liquid from the nozzles spans the gap between nozzles and creates a continuous annular quenching liquid 20 over the entire aligned heated surface. Thus, in operation, the inner surface 18 of the pipe 2 is flooded at a high velocity flow with the supercooled quenching liquid 20 and as a result of the heating and quenching in succession, the desired hardness profile is created.

The present invention is particularly directed to the thin wall pipe that is pipe having a thickness no greater than 0.200 inches and generally in a thickness somewhat less than such maximum. The minimum thickness for lines that can be practically processed has been found to be approximately 0.150 inches.

In order to obtain a most cost effective pipe with the extremely hard inner wall portion while maintaining a significantly less hard and relatively high ductility at outer wall portion, a standard mild steel pipe including significant percentages of carbon and manganese as well as silicon similar to the carbon content is used. The chemical composition which has been found to provide limits which appear to provide the established limits in percentages by weight is as follows:

| | |
|---|---|
| Carbon | 0.27 to 0.34 |
| Manganese | 0.60 to 0.90 |
| Silicon | 0.300% maximum |
| Phosphorous | 0.040% maximum |
| Sulfur | 0.050% maximum |
| Balance | iron |

The traces of phosphorus and sulfur are not significant, but do not adversely affect the hardness characteristic. A typical composition which has produced a commercially cost effective thin wall pipe is as follows:

| | |
|---|---|
| Carbon | 0.29% |
| Manganese | 0.72% |
| Silicon | 0.210% |
| Phosphorous | 0.005% |
| Sulfur | 0.006% |
| Balance | iron |

Although such mild steel is readily available, the prior art has failed to produce any significant application of such thin wall pipe with the desired differential between the inner wall hardness and out wall ductility. Applicant has found that the characteristic is readily produced using the previously described unique heating and cooling sequence wherein any suitable heating unit heats the pipe to the quenching temperature and then substantially instantaneously a refrigerated and overcooled quenching liquid of less than 50° F. is applied to said heated pipe to produce an essentially instant drop in temperature to the quenching liquid temperature at the inner surface of the pipe. Thus, although the induction heating has been used and provides a particularly satisfactory result, any other heating system such as a flame unit can be used. Applicant has found that a 8% brine solution at 42° F. provides a particularly practical and effective quenching medium and effective hardening of the inner wall portion with a particularly effective profile in which the outer surface portion is essentially retains its ductility. The extremely cold water as applied to the heated surface appears to have the characteristic ability of not only establishing reliable hardening but a highly significant repeatable hardening profile with only a slight but desirable penetration into the pipe wall. The overcooled quenching solution appears to establish a cushion and range within the water temperature and its interaction with the heated surface functions such that the repeatable hardness characteristic is created. Thus, the hardness does not appear to have any tendency to vary when the system operates within the usual tolerances associated with mass production of the pipe, with the pipe moving at a speed of five to ten inches per minute.

A characteristic 21 of a pipe wall having a thickness of 0,197 inches is shown in FIG. 3. The characteristic shows the hardness in a Rockwell scale reading of 60 RC over approximately the first 0.04 inches from the inwardmost internal diameter or inner wall surface, over which thickness the hardness is relatively constant. Generally, in practical application, the hardness wall portion is created in a range of 0.04 to 0.06 inches. The hardness profile then gradually changes in a generally linear manner to a lesser hardness. At the outermost wall portion, the hardness decreases to the range of 30 RC. The hardened pipe must have sufficient ductility to withstand the movement encountered in use, with an appropriate transition from the hardened wall. In thin wall pipe for pumping concrete, the above thickness has been found to be particularly satisfactory.

Generally, the inventor has found the hardness varied between an average of 30 RC at the outer wall to 60 RC at the inner wall.

Referring to FIG. 3, a comparison of different pipes is disclosed. The characteristics of a dual wall unit is shown in a phantom graphical illustration 22, and has a square characteristic wherein the inner pipe is essentially totally hardened and the outer wall is a totally ductile material, with a step change at the interface. A further pipe manufactured by the assignee of this application is shown having a characteristic 23 but with a lesser hardness at the inner surface and a lesser ductility at the outer surface. This is typical of a mild steel pipe with a carbon content in the lowest range and is generally considered to provide a minimum characteristic for high pressure flow of abrasive materials.

As previously noted, the pipe is preferably formed with an attachment connector with the inner liner to minimize inlet wear caused by flow turbulence. The illustrated configuration with the liner projecting inwardly of the main pipe or tube further protects the heat effected weld zone and establishes a superior functioning pipe or concrete pumping and like high environmental factors.

In summary, the present invention provides a thin wall mild carbon steel pipe having a unique and particularly practically and useful hardness profile, maintaining optimum internal hardness for pumping of abrasive materials while maintaining the necessary high strength outer wall characteristic to absorb high pressures such as those encountered in concrete pumping.

Various modes of carrying out the invention are contemplated as being within the scope of the following claims particularly pointing out and distinctly claiming the subject matter which is regarded as the invention.

We claim:

1. A thin wall mild carbon steel pipe for transport of concrete and for concrete placement comprising a single solid tubular wall having a thickness in the range of about 0.150 to 0.200 inches and a composition by weight of carbon in the percentage range of 0.27 to 0.34 carbon, manganese in the range of 0.30 to 0.60 and silicon less than about 0.30, traces of phosphorus and the balance iron, and said single solid tubular wall having an inner hardened wall portion of a thickness in the range of 0.04 to 0.06 inches and an outer highly ductile wall portion including a gradual transition in hardness from said inner hardened wall portion.

2. The thin wall mild carbon steel pipe claim 1, including an end pipe connector including an outer ductile tubular member welded to said single solid tubular wall and projecting therefrom, and an inner hardened liner secured within said outer ductile tubular member.

3. The thin wall mild carbon steel pipe of claim 2, wherein said liner projects inwardly of said solid tubular wall.

4. The thin wall mild carbon steel pipe of claim 2, wherein said ductile tubular member includes an annular recess in one end, said single solid tubular wall being located within said recess and projecting inwardly of said ductile tubular member and having an outer projecting wall, a weld abutting said outer projecting wall and the adjacent outer wall portion of said Single solid tubular wall to rigidly connect said ductile tubular member as an extension of said single solid tubular wall, and a liner secured within said ductile tubular member and overlying the end of the inwardly projecting portion of said single solid tubular wall.

5. A thin wall concrete flow pipe for connection together to form a flow line for placement of concrete, comprising a single solid mild carbon tubular steel wall of substantially uniform composition consisting of by weight percentages of substantially like proportions of carbon and silicon, and a greater proportion of manganese than either said carbon or said silicon and the balance substantially iron, said solid mild carbon tubular steel wall having a total thickness in the range of 0.150 to 0.200 inches and having an inner hardened wall portion of thickness in the range of substantially 0.04 to 0.06 inches and an outer ductile wall portion, said hardened wall portion creating abrasive resistant surface for carrying of concrete and said outer ductile wall creating a high strength pipe.

6. The concrete flow pipe of claim 5, wherein said composition consists of carbon 0.27 to 0.34, manganese 0.60 to 0.90, silicon 0.300 maximum, phosphorous 0.040% maximum, sulfur 0.050% maximum and balance iron.

7. The concrete flow pipe of claim 5, wherein said composition consists of carbon 0.29%, manganese 0.72%, silicon 0.210%, phosphorous 0.005%, sulfur 0.006% and balance iron.

* * * * *